US009369820B2

(12) United States Patent
Jan et al.

(10) Patent No.: US 9,369,820 B2
(45) Date of Patent: Jun. 14, 2016

(54) MOBILE COMMUNICATION DEVICE AND APPLICATION INTERFACE SWITCHING METHOD (75) Inventors: Ren-Jung Jan, Taoyuan (TW);
Yi-Hsuan Feng, Taoyuan (TW);
Hsu-Hong Feng, Taoyuan (TW);
Ludovic Romain Guegan, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 97 days.

(21) Appl. No.: 13/552,267

(22) Filed: Jul. 18, 2012

(65) Prior Publication Data
US 2013/0050110 A1 Feb. 28, 2013

Related U.S. Application Data (60) Provisional application No. 61/526,446, filed on Aug. 23, 2011.

(51) Int. Cl.
G09G 5/00 (2006.01)
H04W 4/00 (2009.01)
H04M 1/725 (2006.01)
G08C 17/02 (2006.01)

(52) U.S. Cl.
CPC ............. *H04W 4/001* (2013.01); *G08C 17/02* (2013.01); *H04M 1/7253* (2013.01); *H04M 1/72527* (2013.01); *H04M 1/72533* (2013.01); *G08C 2201/93* (2013.01)

(58) Field of Classification Search
CPC ..... G06F 3/0213; G06F 3/0346; G06F 3/0232; G06F 3/0234; G06F 3/0236; G06F 3/0205; G06F 3/0227
USPC .......................................... 345/156, 157, 169
See application file for complete search history.

(56) References Cited

U.S. PATENT DOCUMENTS

2007/0079245 A1* 4/2007 Oh ................................. 715/740
2007/0159457 A1* 7/2007 Arthur .......................... 345/156
(Continued)

FOREIGN PATENT DOCUMENTS

CN 102110357 A 6/2011
TW M339039 U 8/2008

OTHER PUBLICATIONS

German Office Action dated Feb. 5, 2013.
(Continued)

*Primary Examiner* — Jennifer Nguyen
(74) *Attorney, Agent, or Firm* — McClure, Qualey & Rodack, LLP (57) ABSTRACT A mobile communication device and an application interface layout switch method are disclosed in the invention. The mobile communication device includes a connection interface unit, a layout library, a display panel and a touch sensing module. The connection interface unit is configured for connecting the mobile communication device to an external device. The layout library is configured for storing a plurality of application interface layout templates. The application interface layout templates are different from each other. The display panel can be configured for displaying according to a selected application interface layout template out of the application interface layout templates. The input sensing module is configured for generating a user input signal based on the selected application interface layout template.

17 Claims, 4 Drawing Sheets (56) References Cited

U.S. PATENT DOCUMENTS

| | | | |
|---|---|---|---|
| 2009/0023395 A1 | 1/2009 | Chang et al. | |
| 2009/0298535 A1 | 12/2009 | Klein et al. | |
| 2010/0216508 A1 | 8/2010 | Ma et al. | |
| 2010/0261506 A1 | 10/2010 | Rajamani et al. | |
| 2010/0302190 A1* | 12/2010 | Yeh | G06F 1/1626 345/173 |
| 2010/0317332 A1 | 12/2010 | Bathiche et al. | |
| 2011/0157004 A1* | 6/2011 | Ohashi | 345/156 |
| 2011/0191516 A1 | 8/2011 | Xiong et al. | |
| 2012/0169590 A1* | 7/2012 | Sakao et al. | 345/156 |
| 2014/0055682 A1 | 2/2014 | Ohashi | |

OTHER PUBLICATIONS

German Office Action dated Apr. 5, 2013.

S. Lee and J.W. Jeon, "Evaluating Performance of Android Platform Using Native C for Embedded Systems. In: Proc. of International Conference on Control, Automation and Systems" Oct. 27-30, 2010, S. 1160-1163.

"Android software development" Wikipedia, Jul. 29, 2011.

China Office Action dated Dec. 16, 2014.

* cited by examiner

MOBILE COMMUNICATION DEVICE AND APPLICATION INTERFACE SWITCHING METHOD

RELATED APPLICATIONS

The application claims priority to Provisional Application Ser. No. 61/526,446 filed on Aug. 23, 2011, which is herein incorporated by reference.

BACKGROUND

1. Technical Field

The present disclosure relates to a mobile device. More particularly, the present disclosure relates to a mobile device with a touch screen.

2. Description of Related Art

Recently, mobile communication devices become common belongings to people. For example, mobile phones, personal digital assistants, smart phones and tablet computers are widespread in various applications. The smart phone with a touch screen is the most popular one among these mobile devices, because the smart phone has a compact size and various functions such as internet surfing, multimedia message transmitting, file sharing, document editing, photo shooting and paper reading. In addition, user may easily manipulate the smart phone via its touch screen.

In order to maintain high portability, most of the smart phones have palm-sized display panels served as user interfaces of digital information. The palm-sized display panels should be large enough for traditional applications such as phone dialing and text message typing. When users launch the phone dialing feature, touch screen of the smart phone may show a layout of a number pad. In another case, when users launch the text message typing feature, the touch screen of the smart phone may show a layout of a keyboard (such as a QWERTY keyboard layout or a specific mobile keyboard layout).

Digital household electronics are popular and widespread recently. Each of the household electronics has their own controller with a specific layout designed for its application. For example, the control panel for a television must include bottoms for increasing/decreasing volume, changing channels, switching input source (e.g., between AV-in or TV cable), etc. Most of the times, each controller can only manipulate a specific device. In addition, the specific layout of the controller is usually not suitable for controlling other household electronics (e.g., an air-conditioner, a game box, or a household lamination system). As a result, there exists a need for a universal and highly-integrated controller for multiple kinds of electronic devices, instead of having individual controllers for different devices.

SUMMARY

In order to solve the problems in the art, the disclosure provides a mobile communication device and an application interface layout switching method, which enable user to remotely control various kinds of electronic devices by a mobile communication device. The disclosure provides a solution to switch the layout on the touch screen automatically according to the current-running application program. It may save the effort of user to switch between different controlling programs corresponding to different target electronic devices. The mobile communication device may serves as a multi-functional controller (remote controller, a remote keyboard or a remote joystick) corresponding to all kinds of the external devices.

An aspect of the invention is to provide a mobile communication device includes a communication module, a layout library, a display panel and an input sensing module. The communication module is configured for connecting the mobile communication device to an external device. The layout library is configured for storing a plurality of application interface layout templates. The application interface layout templates are different from each other. The display panel is configured for displaying according to a selected application interface layout template. The touch sensing module is configured for generating a user input signal based on the selected application interface layout template. The user input signal is transmitted to and remotely controlling the external device.

According to an embodiment of the invention, the mobile communication device further includes a control unit electrically connected to the layout library. The control unit is used for dynamically determining one of the application interface layout templates to be the selected application interface layout template.

According to an embodiment of the invention, the control unit dynamically determines the selected application interface layout template according to an application program currently running on the mobile communication device or the external device. In this embodiment, the selected application interface layout template is switched to another application interface layout template in response to activation of another application program running on the mobile communication device or the external device.

According to an embodiment of the invention, the control unit dynamically determines the selected application interface layout template according to a type of the external device currently connected to the mobile communication device. In this embodiment, the selected application interface layout template is switched to another application interface layout template in response to connection between the mobile communication device and another external device.

According to an embodiment of the invention, the selected application interface layout template is re-determined by a user custom selection.

According to an embodiment of the invention, when the external device is provided with a predetermined application interface layout template, the predetermined application interface layout template is added to the layout library as one of the application interface layout templates, and the predetermined application interface layout template is assigned to be the selected application interface layout template during the mobile communication device is connecting to the external device.

According to an embodiment of the invention, an application interface layout template from an external layout database is added to the layout library in response to a user custom instruction.

Another aspect of the invention is to provide a mobile communication device including a communication module, a display panel and a touch sensing module. The communication module is configured for connecting the mobile communication device to an external device. The a display panel is configured for displaying a selected application interface layout template out of a plurality of application interface layout templates according to an application program currently running on the mobile communication device or the external device. The selected application interface layout template is allowed to be re-determined by a user custom selection. The touch sensing module is configured for generating a user input signal based on the selected application interface layout template. The user input signal being transmitted to and remotely controlling the external device.

According to an embodiment of the invention, the mobile communication further includes a layout library and a control unit electrically connected to the layout library. The layout library is configured for storing the application interface layout templates. The control unit is configured for dynamically determining one of the application interface layout templates to be the selected application interface layout template.

According to an embodiment of the invention, the selected application interface layout template is switched to another application interface layout template in response to activation of another application program running on the mobile communication device or the external device.

According to an embodiment of the invention, the selected application interface layout template is determined according to a type of the external device currently connected to the mobile communication device in addition to the currently running application program. In this embodiment, the selected application interface layout template is switched to another application interface layout template in response to connection between the mobile communication device and another external device.

Another aspect of the invention is to provide an application interface layout switching method suitable for a mobile communication device. The application interface layout switching method includes steps of: providing a layout library storing a plurality of application interface layout templates, the application interface layout templates being different from each other; detecting whether the mobile communication device is connected to an external device; determining a selected application interface layout template out of the application interface layout templates when the connection is formed; displaying according to the selected application interface layout template; and, generating a user input signal based on the selected application interface layout template, the user input signal being transmitted to and remotely controlling the external device.

According to an embodiment of the invention, during the step of determining the selected application interface layout template, the selected application interface layout template is determined according to an application program currently running on the mobile communication device or the external device. In this embodiment, the selected application interface layout template is switched to another application interface layout template in response to activation of another application program running on the mobile communication device or the external device.

According to an embodiment of the invention, during the step of determining the selected application interface layout template, the selected application interface layout template is determined according to a type of the external device currently connected to the mobile communication device. In this embodiment, the selected application interface layout template is switched to another application interface layout template in response to connection between the mobile communication device and another external device.

According to an embodiment of the invention, the application interface layout switching method further includes a step of re-determining the selected application interface layout template by a user custom selection.

According to an embodiment of the invention, when the external device is provided with a predetermined application interface layout template, the application interface layout switching method further includes steps of: adding the predetermined application interface layout template into the layout library as one of the application interface layout templates; and, assigning the predetermined application interface layout template to be the selected application interface layout template during the mobile communication device is connecting to the external device According to an embodiment of the invention, the application interface layout switching method further includes a step of: adding an application interface layout template from an external layout database to the layout library in response to a user custom instruction.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 1:
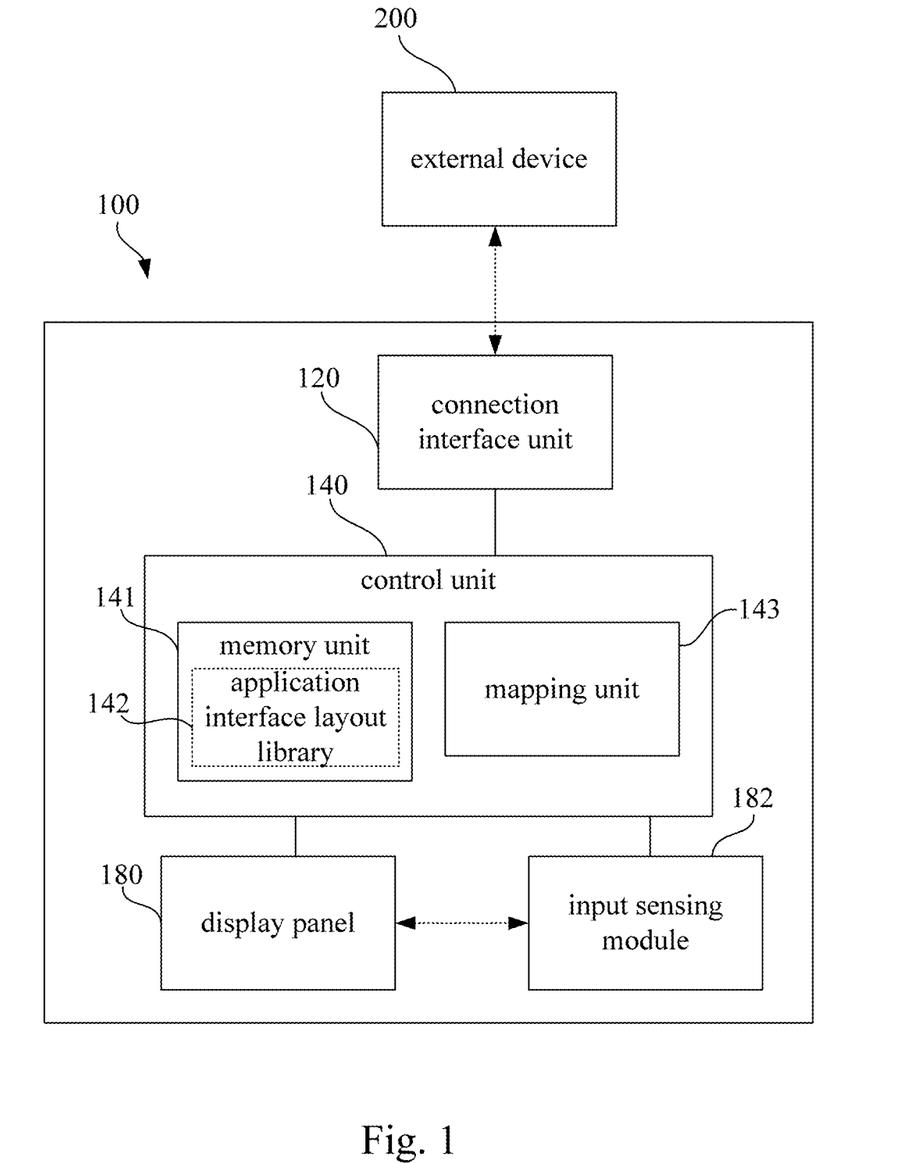
FIG. 1 is a schematic diagram illustrating a mobile communication device according to an embodiment of the invention.

Reference is made to FIG. 1, which is a schematic diagram illustrating a mobile communication device 100 according to an embodiment of the invention. In this embodiment, the mobile communication device 100 includes a connection interface unit 120, a control unit 140, a display panel 180 and an input sensing module 182.

The connection interface unit 120 is configured for communicatively connecting the mobile communication device 100 to an external device 200. In one embodiment of the invention, the external device 200 can be an electronic device, such as a television, a monitor, a computer, a mobile phone, a tablet, a game console, a household electronics, etc. The mobile communication device 100 can be utilized as an interface with other peripheral devices (e.g., keyboard, mouse, microphone, joystick, GPS signal source, etc.) and/or to the external device 200. The connection interface unit 120 may support wireless communication, such as a Wi-Fi, near field communication (NFC), Bluetooth, infrared, Digital Living Network Alliance (DLNA) or any equivalent communication protocol for transmitting information between the connection interface unit 120 and the external device 200. The connection interface unit 120 may also support wired communication, such as USB, HDMI, VGA and/or other suitable protocols. The connection interface unit 120 may be configured for providing display data to the external device 200 such that user may view the image on a bigger screen. For example, the mobile communication device 100 may transmit video data to an LCD monitor via the connection interface unit 120.

The display panel 180 may display image data (e.g., text, picture or video) to users. In addition, the input sensing module 182 can be integrated with the display panel 180 to form an input-sensitive screen, for example a touch screen. In this case, the display panel 180 may display some operative bottoms or icons. When users touch the corresponding area of the operative bottoms or icons, the input sensing module 182 may sense user's inputs and generate a user input signal accordingly.

Figure 2:
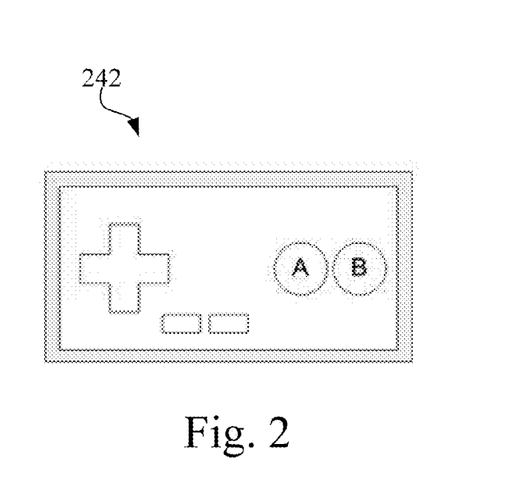
FIG. 2 is a schematic diagram illustrating an application interface layout template of the mobile communication device according to an embodiment of the invention.
Figure 3:
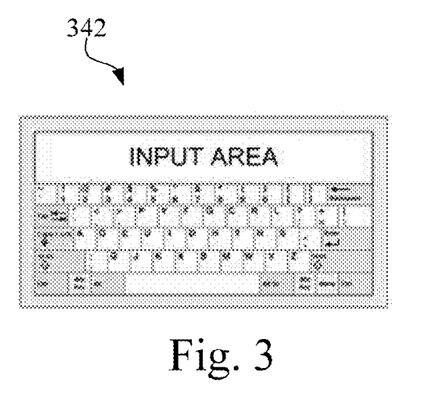
FIG. 3 is a schematic diagram illustrating another application interface layout template of the mobile communication device according to an embodiment of the invention.
Figure 4:
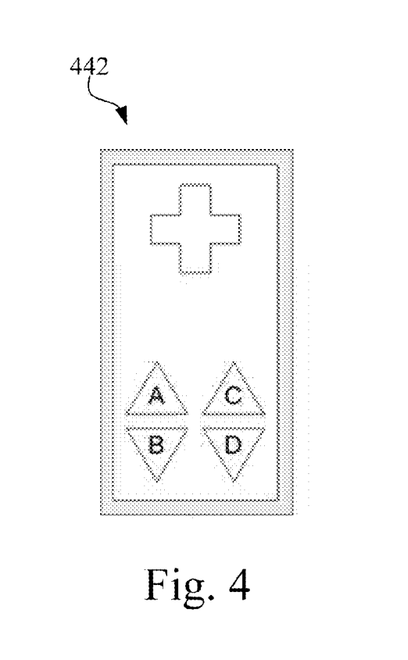
FIG. 4 is a schematic diagram illustrating another application interface layout template of the mobile communication device according to an embodiment of the invention.

The control unit 140 comprises, among other components, a memory unit 141 and a mapping unit 143. In this embodiment, the memory unit 141 of the mobile communication device 100 is configured for storing a plurality of application interface layout templates in an application interface layout library 142. Reference is made to FIG. 2, FIG. 3 and FIG. 4, which are schematic diagrams illustrating some different application interface layout templates 242, 342 and 442 of the mobile communication device 100 according to an embodiment of the invention. Because the application interface layout templates 242, 342 and 442 are different from each other and correspond to different application, or operations, the user input signals generated under different application interface layout templates 242, 342 and 442 may represent different instructions.

For example, FIG. 2 illustrates the application interface layout template 242 of a gaming pad. The gaming pad layout may include functional keys for gaming (e.g., start, select, directional keys, action keys, etc.). FIG. 3 illustrates the application interface layout template 342 of a virtual keyboard. The virtual keyboard layout may include functional keys for typing (e.g., alphabets A to Z, backslash, enter, and other common keys on a keyboard, etc). FIG. 4 illustrates the application interface layout template 442 of a remote controller for a household electronic (e.g., a television). The remote controller layout may include functional keys for controlling the television (e.g., volume up, volume down, channel switching keys, directional keys, etc.).

In addition, the application interface layout template for the household electronics in the invention is not merely limited to the pattern shown in FIG. 4. Each kind of the household electronics may have a specific layout appropriate for their application. For example, a remote controller layout for an air-conditioner may have keys like temperature up, temperature down, fan speed, on/off, time-setting, etc. FIG. 4 is an example for one kind of application interface layout template for the household electronics, and the invention is not limited thereto.

FIG. 2, FIG. 3 and FIG. 4 are used to demonstrate some examples of application interface layout templates. However, the application interface layout templates of the mobile communication device 100 are not merely limited to the application interface layout templates 242, 342 and 442 shown in FIG. 2 to FIG. 4.

The display panel 180 is configured for displaying an application interface layout template selected from the application interface layout templates (such as shown in FIG. 2, FIG. 3 and FIG. 4). The display panel 180 may also display messages to the user, such as metadata, alert messages, control tutorial, system notification, user hint and/or other useful information. For example, the display panel may provide in-coming call notification, unread message notification, battery alert, and/or others. These messages may be displayed together with the application interface layout templates or alone depending on the type of messages.

And the input sensing module 182 is configured for receiving user inputs. For example in an embodiment that the input sensing module is touch sensitive and integrated with the display panel 180 to form a touch screen, when a user touches on the surface of the touch screen, the input sensing module 182 is configured for sensing the position of the user contact and accordingly generating a user input signal based on the contact position on the application interface layout template. The user input signal may be translated by the mapping unit 143 to generate a control signal. The control signal is used for controlling operations of application program currently running, either on the mobile communication device 100 or on the external device 200. Upon receiving the control signal, the application program may execute operation corresponding to the control signal. In an embodiment of the invention, the control signal may be in the form of an event signal. The event signal is transmitted to corresponding application program for execution. The event signal may comprise information about corresponding operation. In another embodiment of the invention, the control signal may be transmitted via the connection interface unit 120 for remotely controlling application program running on the external device.

The mapping unit 143 receives the user input signal, which may comprise information of the contact position, and translates the user input signal to the control signal according to the application interface layout template currently selected and the contact position. Translation of control signal may be implemented by a lookup table comprising correspondence of contact positions and corresponding control operations/instructions for each of the application interface layout template in the application interface layout library 142 in an embodiment of the invention, but is not limited to this embodiment.

In addition to touch screen, the input sensing module 182 may comprise other modules for generating some other control data. For example, the input sensing module 182 may also include a voice collector (not shown in figures) for generating a voice input, a g-sensor for generating a gravity-sensing result (e.g., torque, angular velocity, angular acceleration and rotating direction). The input module 182 may also be integrated with other external control device for providing user input signal. For example, the input sensing module 182 may be integrated with a keyboard, track pad, mouse, joystick, motion sensing input device and/or others. The mobile communication device 100 may send these control data along with the user input signal to the external device, such that the mobile communication device 100 may serves as a multi-functional controller (e.g., a remote controller, a remote keyboard, an external GPS signal source or a remote joystick) corresponding to all kinds of the external devices.

The control unit 140 of the mobile communication device 100 is configured for dynamically determining one of the application interface layout templates stored in the application interface layout library 142 to be the selected application interface layout template displayed on the display panel 180. Upon connecting to the external device 200, the connection interface unit 120 may communicate signals with the external device, which comprises information of the external device

200 and/or application currently running on the external device 200. The control unit 140 may determine the identity/type of the external device according to the information and thus determine which application interface layout template to be selected from the application interface layout library 142. In another embodiment, the control unit 140 may provide manual selection of application interface layout template to the user, or receive application interface layout template from the external device 200. The display panel 180 is configured for displaying the application interface layout template selected to the user. To be noticed that, the mobile communication device 100 of the embodiment may automatically determine application interface layout template according to external device connected, application program currently running on the mobile device 100 and/or the external device 200, and/or other criteria.

In one embodiment, the control unit 140 dynamically determines the selected application interface layout template according to an application program currently running on the mobile communication device 100 or the external device 200. For example, when the mobile communication device 100 or the external device 200 is currently executing a text-chatting program, the control unit 140 may select the application interface layout template 342 (shown in FIG. 3) as the selected application interface layout template. In addition, when application program running on the mobile communication device 100 or the external device 200 is changed, the application interface layout template currently selected can be switched to another correspondingly. For example, when another application program (e.g., arcade game) is activated on the mobile communication device 100 or the external device 200, the application interface layout template provided can be switched from the application interface layout template 342 to the application interface layout template 242 (shown in FIG. 2) in response to the change of the currently-running application program (from a text-chatting program to an arcade game).

In another embodiment, the control unit 140 dynamically determines the application interface layout template according to a type of the external device 200 currently connected to the mobile communication device 100. For example, when the external device 200 currently connected with the mobile communication device 100 is a household electronic (e.g., a television), the control unit 140 may select the application interface layout template 442 (shown in FIG. 4) as the selected application interface layout template. In addition, when the external device 200 currently connected to the mobile communication device 100 is changed to another one, the application interface layout template provided on the display panel 180 can be switched correspondingly. For example, when the external device 200 currently connected to the mobile communication device is changed from a television to a game console, the application interface layout template displayed can be switched from the application interface layout template 442 to the application interface layout template 242 (shown in FIG. 2) in response.

Yet in another embodiment of the invention, during the connection to the external device 200, the application program currently running may actively call for service of a specific application interface layout template. In this embodiment, the application program may send a request to the control unit 140. The request may comprise information about the requesting application program, specific type of application interface layout template, and/or other related information. For example, the application program currently running is a web browser. In response to the user moves cursor/icon/indicator to a text field, the web browser may request for a QWERTY keyboard layout template. The application program may request for other type of keyboard as well.

In aforesaid two embodiments of selecting the application interface layout template provided to user, the application interface layout template utilized on the mobile communication device 100 may further be re-determined by a user custom selection. The mobile communication device 100 may further include physical or virtual switch keys (not shown in figure) for user to switch the application interface layout template.

In addition, the layout library 142 of the mobile communication device 100 may store several common layouts suitable for various kinds of applications or devices. However, the electronic industry is always trying to develop new applications or devices, which may not be recognized by the mobile communication device 100 by default settings. In such conditions, suitable application interface layout template cannot be found in the built-in layout library 142. When the external device 200 is provided with a predetermined application interface layout template suitable of the external device 200, the predetermined application interface layout template is added to the application interface layout library 142. Accordingly, the predetermined application interface layout template can be assigned for displaying on the display panel 180 in response to the mobile communication device 100 is connecting to the external device 200.

In another embodiment of the invention, the application interface layout library 142 of the mobile communication device 100 can be updated by users. For example, an application interface layout template from an external layout database (e.g., an on-line layout database) may be added to the application interface layout library 142 in response to a user custom instruction. When a new kind of the application interface layout template is developed, users may manually update the application interface layout library 142 on their mobile communication device 100. For example, user may update application interface layout library via system module update, application update and/or other kinds of update provided by the developer of the application program or external device 200. The update may be executed by over-the-air, ROM fresh and/or other methods.

Figure 5:
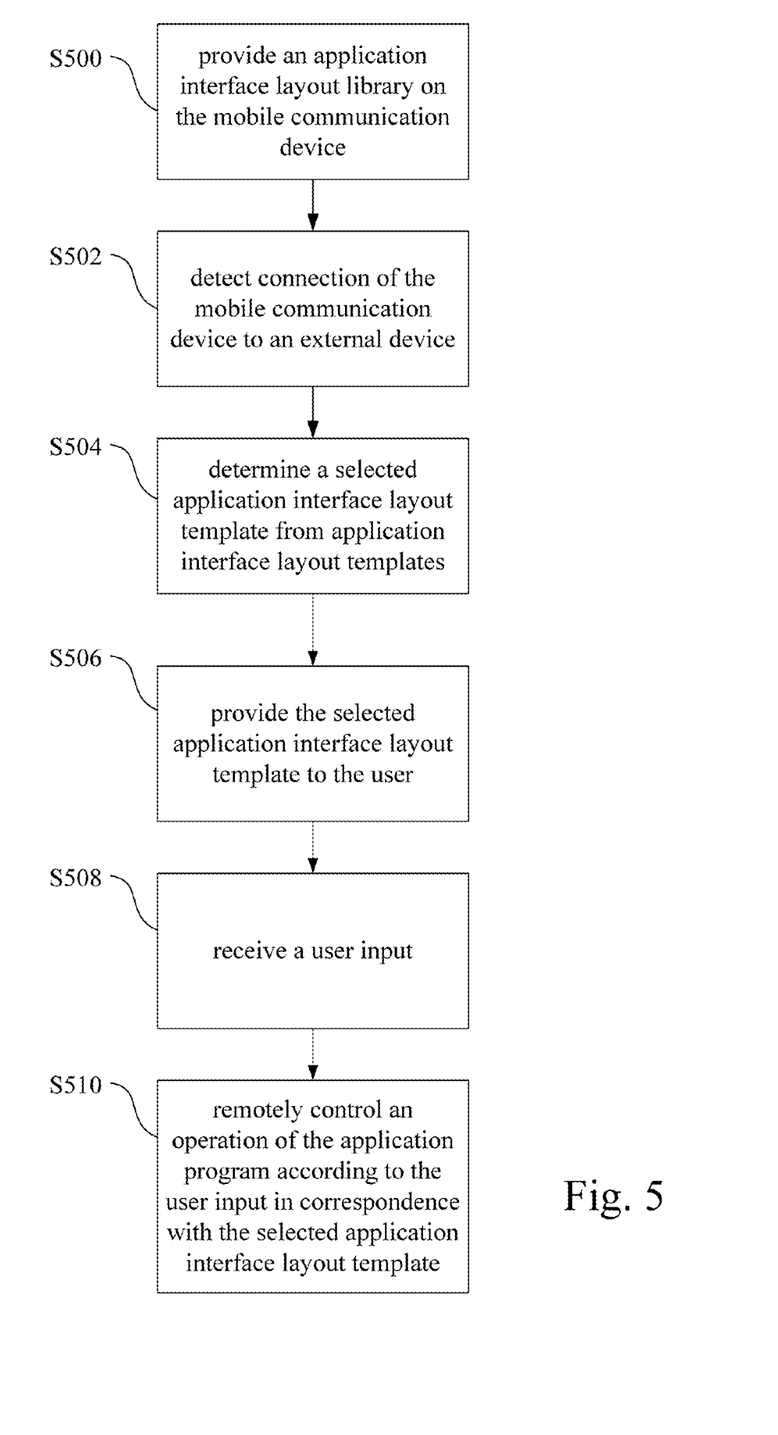
FIG. 5 is a flow chart illustrating an application interface layout switch method according to an embodiment of the invention.

Reference is made to FIG. 5, which is a flow chart illustrating an application interface layout switch method according to an embodiment of the invention. The application interface layout switch method can be performed on the mobile communication device 100 or any equivalent mobile devices.

As shown in FIG. 5, the application interface layout switch method starts from step S500 for providing an application interface layout library on the mobile communication device. The application interface layout library may comprise a plurality of application interface layout templates and may be stored in a memory unit. The application interface layout templates correspond to different devices, application programs and/or operations (referring to FIG. 2 to FIG. 4).

Afterward, step S502 is executed for detecting connection of the mobile communication device to an external device. In response to the mobile communication device is connected to an external device, step S504 is executed for determining a selected application interface layout template from the plurality of the application interface layout templates. Afterward, step S506 is executed for providing the selected application interface layout template to the user, for example displaying on a display panel of the mobile communication device (referring to FIG. 1).

Afterward, step S508 is executed for receiving a user input, for example via an input sensing module. And then, step S510 is executed for remotely controlling an operation of the application program according to the user input and its correspondence with the selected application interface layout template.

In an embodiment, during aforesaid step S504 of determining the selected application interface layout template, the selected application interface layout template is determined according to an application program currently running on the mobile communication device or the external device. In this embodiment, the selected application interface layout template can be switched to another application interface layout template in response to activation of another application program running on the mobile communication device or the external device.

In another embodiment, during aforesaid step S504 of determining the selected application interface layout template, the selected application interface layout template is determined according to a type of the external device currently connected to the mobile communication device. In this embodiment, the selected application interface layout template is switched to another application interface layout template in response to connection between the mobile communication device and another external device. The detail explanations and examples about determining the selected application interface layout template has been disclosed in aforesaid embodiment of the mobile communication device 100, and not to be repeated here.

In another embodiment, the application interface layout switch method may further include a step of re-determining the selected application interface layout template by a user custom selection.

Figure 6:
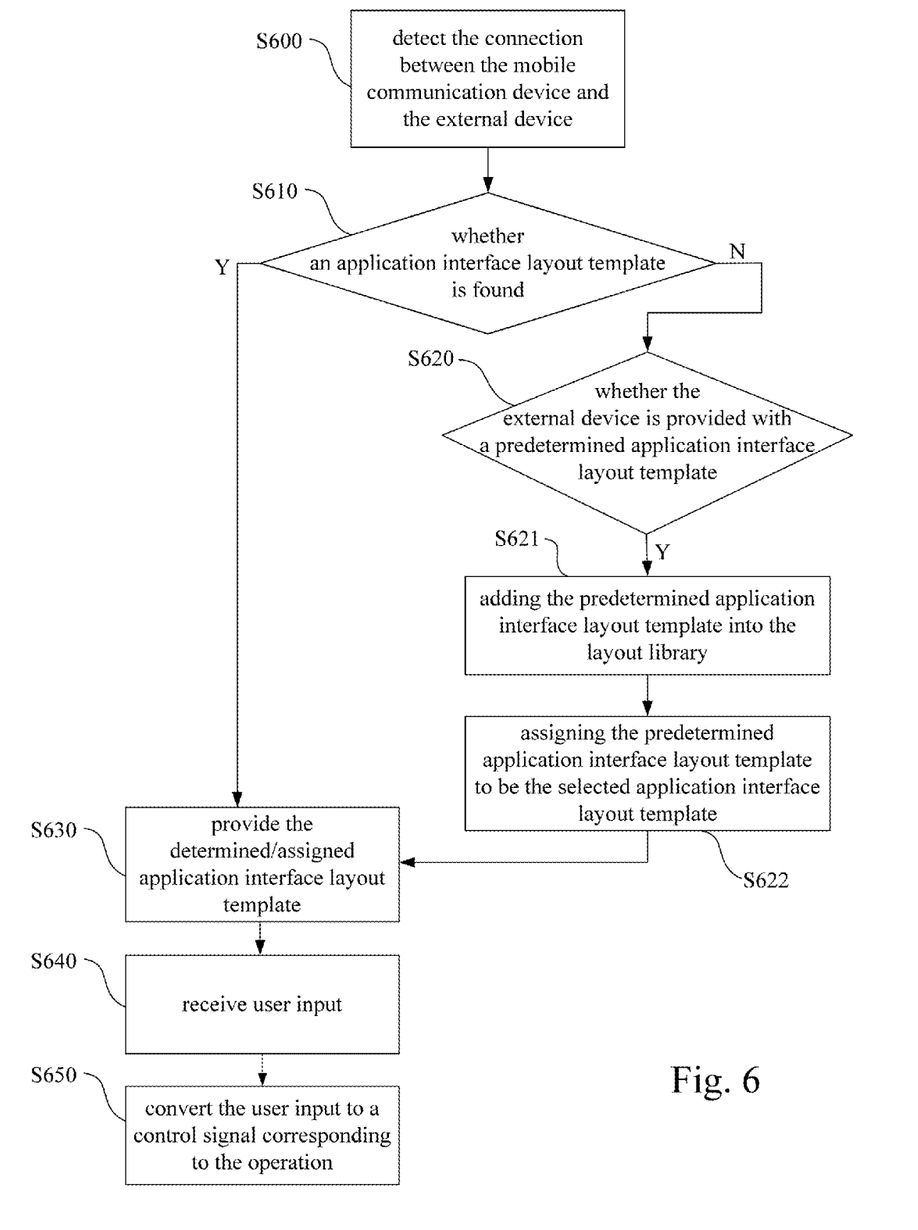
FIG. 6 is a flow chart illustrating an application interface layout switch method according to an embodiment of the invention.

Reference is made to FIG. 6, which is another flow chart illustrating an application interface layout switch method according to an embodiment of the invention. In the embodiment shown in FIG. 6, the external device may be provided with a predetermined application interface layout template, which can be a specific application interface layout template suitable for the external device and not existed in the application interface layout library built in the mobile communication device. In this embodiment, the display unit and the input-seining module together form a touch screen unit.

As shown in FIG. 6, in step S600, the connection between the mobile communication device and the external device is detected. In response to the connection between the mobile communication device and the external device is detected, step S610 determines whether an application interface layout template is found. In response to a suitable application interface layout template is not found, the application interface layout switch method further executes step S620 for determining whether the external device is provided with a predetermined application interface layout template. If the external device is provided with a predetermined application interface layout template, then, step S621 is executed for adding the predetermined application interface layout template into the application interface layout library as one of the application interface layout templates.

Afterward, the application interface layout switch method further executes step S622 for assigning the predetermined application interface layout template to be the selected application interface layout template during the mobile communication device is connecting to the external device with the predetermined application interface layout template.

In response to an application interface layout template is found in step S610, or a suitable application interface layout template is added and assigned after step S622, the application interface layout switch method proceeds step S630 to provide the determined/assigned application interface layout template on the touch screen unit. Then in step S640 the touch screen unit receives user input from user in the form for example a tap on a position of application interface layout template. The position corresponds to an operation of the application program currently running. Please note that each position of the application interface layout template may correspond to various operation of the application program. For example, a user input on the position of character "A" in the application interface layout template of FIG. 3 corresponds to the operation of typing a letter "A". Step S650 converts the user input to a control signal corresponding to the operation. The control signal may be transmitted to the external device in response to the application program is running on the external device. And the operation is executed in step S660. In the above example, a letter "A" is typed and displayed on the screen of the external device.

In addition, the application interface layout switch method may further comprise a step (not shown in figures) of adding an application interface layout template from an external layout database to the layout library in response to a user custom instruction.

As shown in aforesaid embodiments, the disclosure provides a mobile communication device and an application interface layout switch method, which enable user to control various kinds of electronic devices by a mobile communication device. The disclosure provides a solution to switch the application interface layout automatically according to the current-running application program. It may save the effort of user to switch between different controlling programs corresponding to different target electronic devices. The mobile communication device may serves as a multi-functional controller (remote controller, a remote keyboard or a remote joystick) corresponding to various kinds of the external devices.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A mobile communication device, comprising:
   a connection interface unit for connecting the mobile communication device to an external device;
   a control unit for dynamically selecting a first application interface layout template to control a first application program;
   a display panel for displaying the first selected application interface layout template; and
   an input sensing module for receiving user input corresponding to one or more position on the first selected application interface layout template and providing the user input to the control unit;
   wherein the control unit translates the user input and provides control signal corresponding to the user input;
   wherein the control unit dynamically determines the first selected application interface layout template according to the first application program currently running on the mobile communication device or currently running on the external device;
   wherein the control unit dynamically selects a second application interface layout template to control a second application program in response to activation of the second application program running on the external device during the connection to the external device;

wherein the second application interface layout template is displayed on the display panel.

2. The mobile communication device of claim 1, wherein the control unit dynamically determines the first selected application interface layout template according to a type of the external device currently connected to the mobile communication device.

3. The mobile communication device of claim 2, wherein the first selected application interface layout template is switched to the second application interface layout template in response to connection between the mobile communication device and another external device.

4. The mobile communication device of claim 1, wherein the first selected application interface layout template is determined according to at least one of the following: a type of the external device, the first application program currently running, user selection and a request by the application currently running.

5. The mobile communication device of claim 1, wherein the control unit further comprises:
   a memory unit for storing a plurality of application interface layout templates corresponding to a plurality of application programs; and
   a mapping unit for translating the user input according to a position of the user input in the first selected application interface layout template to the control signal corresponding to an operation of the first application program.

6. The mobile communication device of claim 5, wherein the mapping unit comprises a mapping table, the mapping table contains correspondence of a plurality of user inputs to a plurality of operations for each of the plurality of application programs.

7. The mobile device of claim 1, wherein a predetermined application interface layout template is transmitted from the external device to the control unit, and is assigned to be the first selected application interface layout template corresponding to the external device in response to the mobile device is connected to the external device.

8. A mobile communication device, comprising:
   a display panel for displaying a first selected application interface layout template according to a first application program currently running on the mobile communication device or currently running on an external device connected to the mobile device;
   a control input module for generating a control input signal based on the first selected application interface layout template and a user input signal corresponding to a position of the first selected application interface layout template, the control input signal is used for controlling display content or operation on the external device; and
   a control unit for dynamically selecting a second application interface layout template to control a second application program in response to activation of the second application program running on the external device during the connection to the external device;
   wherein the second application interface layout template is displayed on the display panel.

9. The mobile communication device of claim 8, wherein the control unit for dynamically determining the first selected application interface layout template from a plurality of application interface layout templates.

10. The mobile communication device of claim 9, wherein the control unit further determines an operation to be performed by the first application program based on the user input signal.

11. The mobile communication device of claim 10, wherein an operation control signal corresponding to the operation is transmitted to the external device in response to the first application program is currently running on the external device.

12. The mobile communication device of claim 8, wherein the first selected application interface layout template comprises one or more positions, each of the position corresponds to an operation of the first application program.

13. An application interface layout switch method, suitable for a mobile communication device, comprising:
   detecting connection of the mobile communication device to an external device;
   determining a first selected application interface layout template from an application interface layout library according to a first application program currently running in response to connection to the external device;
   providing the first selected application interface layout template to a user;
   receiving a user input via the first selected application interface layout template; and
   controlling an operation of the first application program according to the user input;
   wherein content of the first application program is displayed on the external device;
   dynamically selecting a second application interface layout template to control a second application program in response to activation of the second application program running on the external device during the connection to the external device;
   wherein the second application interface layout template is displayed on the mobile communication device.

14. The application interface layout switch method of claim 13, wherein during the step of determining the first selected application interface layout template, the selected layout template is determined according to a type of the external device currently connected to the mobile communication device.

15. The application interface layout switch method of claim 14, wherein the first selected application interface layout template is switched to the second application interface layout template in response to connection of the mobile communication device to another external device.

16. The application interface layout switch method of claim 13, further comprising:
   converting the user input to a control signal by mapping received location of the user input in the first selected application interface layout template to the operation of the first application program currently running; and
   executing the operation of the first application program in response to the control signal.

17. The application interface layout switch method of claim 13, wherein in response to the external device is provided with a predetermined application interface layout template, the application interface layout switching method further comprises steps of:
   adding the predetermined application interface layout template in the application interface layout library; and
   assigning the predetermined application interface layout template to be the first selected application interface layout template corresponding to the external device.

* * * * *